United States Patent [19]
Chiang

[11] Patent Number: 6,008,485
[45] Date of Patent: Dec. 28, 1999

[54] IMAGE CAPTURING DEVICE HAVING DE-FRICTION FUNCTION

[75] Inventor: Te-Ming Chiang, Taipei Hsien, Taiwan

[73] Assignee: Primax Electronics Ltd., Taipei Hsien, Taiwan

[21] Appl. No.: 08/984,522

[22] Filed: Dec. 3, 1997

[30] Foreign Application Priority Data

Oct. 23, 1997 [TW] Taiwan .................................. 86217956

[51] Int. Cl.$^6$ ..................................................... H01L 27/00
[52] U.S. Cl. ......................................... 250/208.1; 358/474
[58] Field of Search ........................ 250/208.1, 234–236, 250/239; 358/474, 482, 483, 493, 494

[56] References Cited

U.S. PATENT DOCUMENTS 5,101,285  3/1992  Kawai et al. ......................... 250/208.1
5,153,750  10/1992  Hiroi et al. .............................. 358/474

Primary Examiner—Stephone Allen
Attorney, Agent, or Firm—Bacon & Thomas

[57] ABSTRACT

An image capturing device having de-friction function is disclosed. The present invention comprises a substantially rectangular transparent platform, an image sensing module which includes a sensor means and an accomodation base, and a supporting member. A plurality of spherical elements are provided on a first surface of the accomodation base while a "point contact" relation is retained between the spherical elements and the transparent platform in order to reduce the frictional resistance when moving the image sensing module.

5 Claims, 3 Drawing Sheets

IMAGE CAPTURING DEVICE HAVING DE-FRICTION FUNCTION

BACKGROUND OF THE INVENTION

1. Field of the Invention

The present invention relates to an image capturing device, and more particularly, to an image capturing device which has de-friction function.

2. Description of the Prior Art

An innovative image capturing component, such as contact image sensor (CIS), has been commonly ultilized in nowadays flatbed scanners which structure is illustrated in FIG. 1. The traditional flatbed scanner comprises a transparent platform 10, a CIS module 20, a friction pad 40 and a supporting member 30, wherein the CIS module 20 further includes a CIS 201 and an accomodation base 202, the supporting member 30 further includes a spring 31 and a roller 32.

The CIS module 20 having a contact surface 21 is installed beneath the transparent platform 10, and its contact surface 21 is arranged parallel to the transparent platform 10. The friction pad 40 is provided on each corner of the contact surface 21 and is biased against the transparent platform 10 by an elastic force generated by the spring 31. When a scanning process is triggered, the supporting member 30 is driven by a transmission mechanism (not shown) of the flatbed scanner, and the CIS module 20 moves along the transparent platform 10 so that an image of an object to be scanned can be captured. The function of the friction pad 40 is to retain a fixed gap between the contact surface 21 of the CIS module 20 and the transparent platform 10 so that a correct focus can be secured.

However, since the friction pad 40 is generally in square or round shape, that is, the friction pad 40 ultilized by the CIS module 20 is in a "face contact" with the transparent platform 10, therefore, when the CIS module 20 moves along the transparent platform 10, a greater friction resistance will be generated to the transparent platform 10 by the friction pad 40.

SUMMARY OF THE INVENTION

It is therefore a primary object of the present invention to provide an image capturing device in which a plurality of spherical elements are provided on the accomodation base of the CIS module of the image capturing device, and a "point contact" relation is maintained between the spherical elements and the transparent platform of the image capturing device in order to reduce the frictional resistance when moving the CIS module.

Briefly, an image capturing device having de-friction function is disclosed which comprises a substantially rectangular platform on which an object to be scanned being placed; an image sensing module including a sensor means for capturing an image of the object to be scanned having a contact surface arranged adjacent and parallel to the rectangular platform; an accomodation base for accomodating the sensor means; and a supporting member provided beneath the image sensing module for driving the image sensing module along the rectangular platform and providing an elastic force to the image sensing module; wherein at least a spherical element is provided on a first surface of the accommodation base and the spherical element is biased against the rectangular platform by the elastic force such that a gap being maintained between the contact surface of the sensor means and the rectangular platform.

In accordance with one aspect of the present invention, the spherical element is a ball bearing and each corner of the first surface of the accommodation base is provided with such ball bearing.

In accordance with one aspect of the present invention, the sensor means is a contact image sensor (CIS) and the rectangular platform is transparent.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
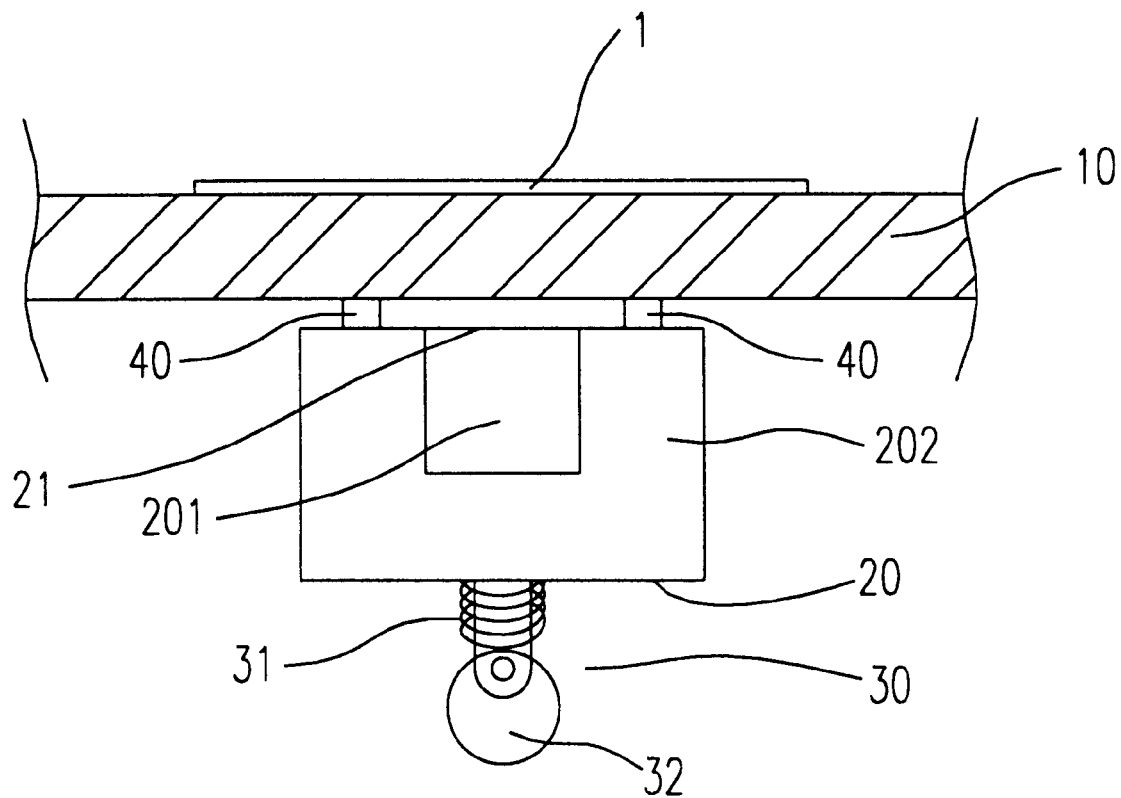
FIG. 1 illustrates a side view of the transparent platform and the CIS module of a traditional flatbed scanner.
Figure 2:
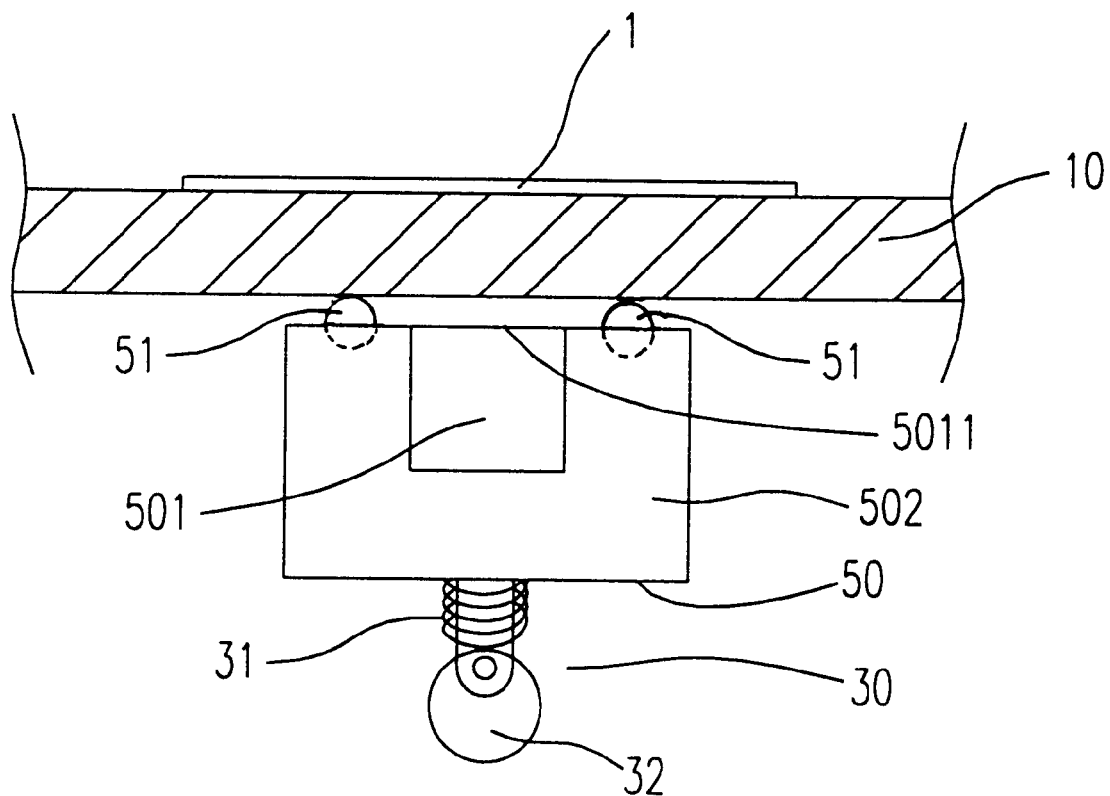
FIG. 2 illustrates a side view of the transparent platform and the image sensing module of a preferred embodiment of the present invention.
Figure 3:
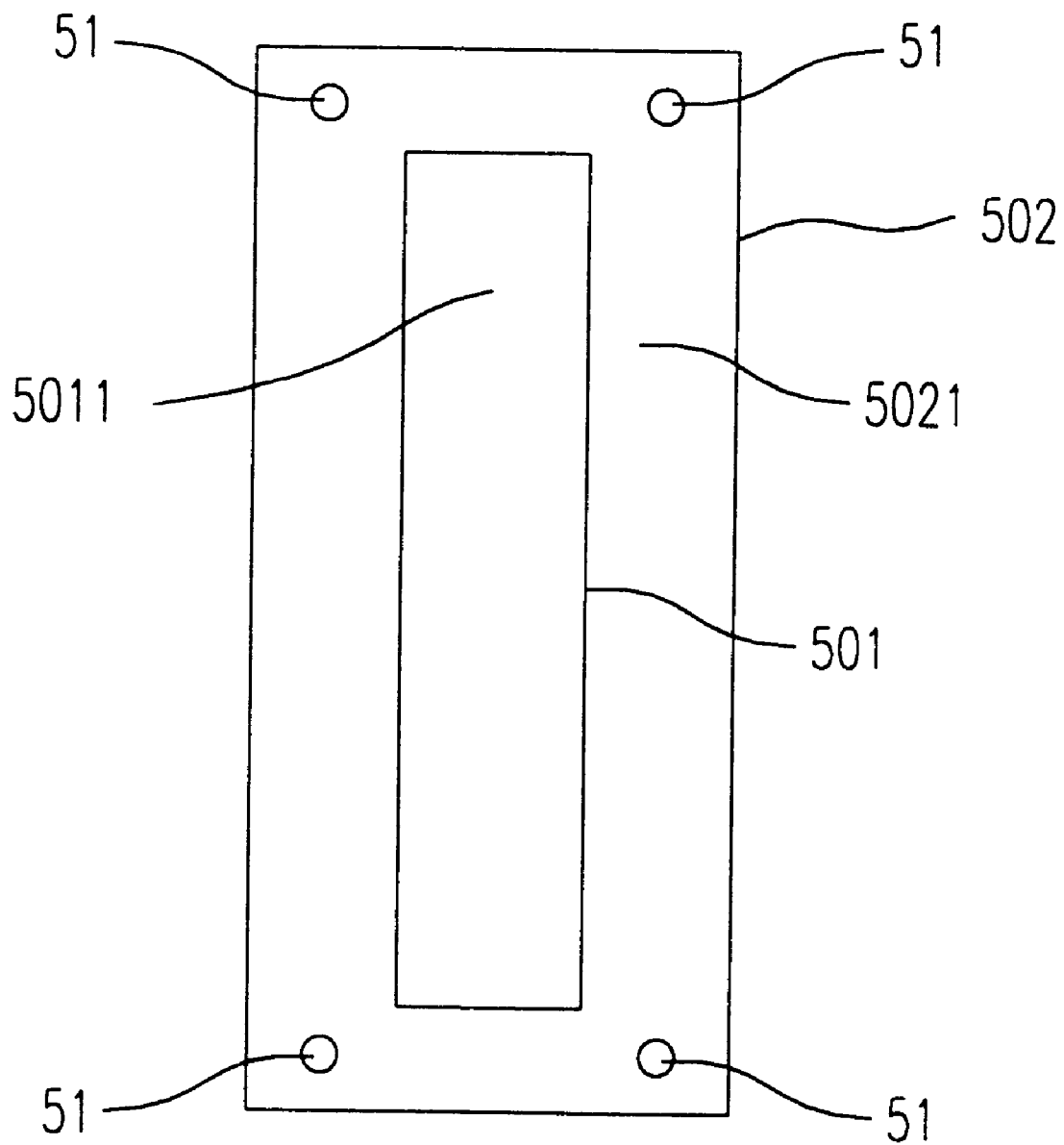
FIG. 3 is a top view of the image sensing module according to the present invention.

The preferred image capturing device according to the present invention shown in FIG. 2 comprises a substantially rectangular platform 10, transparent is preferred, on which an object to be scanned 1 is placed; an image sensing module 50 including a sensor means, which is a contact image sensor (CIS) 501, for capturing an image of the object to be scanned 1 and an accommodation base 502 having a first surface 5021 for accomodating the CIS 501, wherein the CIS 501 further includes a contact surface 5011 arranged adjacent and parallel to the transparent platform 10; a supporting member 30 mounted beneath the image sensing module 50 which includes a spring 31 and a roller 32 for moving the image sensing module 50 along the transparent platform 10 and providing an elastic force to the image sensing module 50. The first surface 5021 of the accommodation base 502 is provided with at least a spherical element 51 which is biased against the transparent platform 10 by the elastic force generated by the spring 31, so that a gap is maintained between the contact surface 5011 of the CIS 501 and the transparent platform 10.

The spherical element 51 is preferrably made of harder materials, e.g. steel or rubby. Ball bearing is preferred in the present invention. The quantity and position of the ball bearing 51 depend on how the gap can be maintained between the image sensing module 50 and the transparent platform 10. Preferably each corner of the first surface 5021 of the accommodation base 502 is provided with a ball bearing 51.

Owning to a fixed gap is maintained by allocating a ball bearing 51 between the image sensing module 50 and the transparent platform 10, thus, the ball bearing 51 and the transparent platform 10 is in a "point contact" relation, the contact area is relatively smaller than that of the prior "face contact" relation, so that the frictional resistance during movement of the image sensing module 50 will be greatly reduced.

The above disclosure is not intended as limiting. Those skilled in the art will readily observe that numerous modifications and alterations of the system may be made while retaining the teachings of the invention. Accordingly, the above disclosure should be construed as limited only by the metes and bounds of the appended claims.

What is claimed is:

1. An image capturing device having de-friction function, comprising:

a substantially rectangular platform on which an object to be scanned being placed;

an image sensing module including:
- a sensor means having a contact surface adjacent and parallel to said rectangular platform for capturing an image of said object to be scanned;
- an accommodation base having a first surface for accommodating said sensor means; and a supporting member provided beneath said image sensing module for driving said image sensing module along said rectangular platform and providing an elastic force to said image sensing module;

wherein at least a spherical element being provided on said first surface of said accommodation base and said spherical element being biased against said rectangular platform by said elastic force such that a gap being maintained between said contact surface of said sensor means and said rectangular platform.

2. The image capturing device of claim 1 wherein said spherical element is a ball bearing.

3. The image capturing device of claim 1 wherein a ball bearing is provided on each corner of said first surface of said accommodation base.

4. The image capturing device of claim 1 wherein said sensor means is a contact image sensor (CIS).

5. The image capturing device of claim 1 wherein said rectangular platform is transparent.

* * * * *